Patented May 24, 1938

2,118,184

UNITED STATES PATENT OFFICE 2,118,184

CARBONATED COFFEE BEVERAGES

Douglas Fronmuller, Middle Village, and Frank M. Boyles, Brooklyn, N. Y., assignors to Coffee Products Corporation, New York, N. Y., a corporation of New York No Drawing. Application October 25, 1935, Serial No. 46,738

5 Claims. (Cl. 99—65)

This invention relates to improvements in the manufacture of carbonated coffee beverages, and includes an improved coffee concentrate or concentrated coffee extract for use in making such beverages, an improved process of making such beverages with the use of such concentrate, and the improved carbonated coffee beverages resulting therefrom. More particularly, the invention relates to an improved coffee concentrate and process for making carbonated coffee beverages without objectionable foaming, and an improved bottled carbonated coffee beverage free from objectionable foaming properties.

Concentrated coffee extracts are prepared by extracting roasted coffee and concentrating the extract for example, to a concentration such that one gallon of the concentrate represents the extract from about 11 pounds of coffee beans.

When such a coffee concentrate is diluted with a sugar syrup and admixed with carbonated water to form a carbonated coffee beverage, considerable foaming ensues of an objectionable character, both during the carbonation and bottling of the beverage, and when the bottle containing the beverage is opened. The foam produced is of a more or less stable and persistent character.

We have found that this objectionable foaming can be eliminated, or minimized to an unobjectionable extent, by the addition, to the coffee concentrate, of a small amount of a chemical foam inhibitor. The chemical which we have found particularly advantageous for this purpose is disodium phosphate dodecahydrate. The addition of such a foam inhibitor to the concentrated coffee extract enables it to be used in making carbonated coffee beverages without objectionable foaming, and gives an improved carbonated coffee beverage which is substantially free from objectionable foaming properties.

The concentrated coffee extracts which we have investigated have had a pH value of about 5 to 5.1. We have found it advantageous to add a foam inhibitor in the form of a very weak alkali, such as the acid salts of the polybasic type, to increase the pH value of the concentrates, for example, to around 5.7. The use of strong alkalies in amounts such that they react with aromatic components present in the concentrate to cause partial saponification is undesirable. But by the use of a milder alkali such as disodium phosphate, this objectionable action is avoided, while the disodium phosphate appears to have other advantages in giving an improved product, other than its property as a foam inhibitor. We do not, however, wish to limit ourselves by any theoretical explanation of the action of the foam inhibitor, whether by decrease of the surface tension of the material, or by increase of the pH value, or by some other action; although the increase in the pH value appears to be desirable, perhaps by neutralizing acid constituents of the concentrates, or reducing the acidity of the concentrates, while the presence of the added phosphate in the resulting beverage is unobjectionable, and is rather desirable in that it increases the content of mineral phosphate in the beverage.

The coffee concentrates, to which the foam inhibitor is added, are coffee concentrates such as are obtainable by extracting freshly roasted coffee and concentrating the resulting extract, for example, to such an extent that one gallon of the concentrate is equivalent to about 11 pounds of bean coffee extracted, although a higher or lower concentration can be employed. An improved coffee concentrate can be advantageously prepared in accordance with the process of our prior application Serial No. 733,558, filed July 3, 1934, which contains highly volatile constituents given off in vapor form during the extraction of the roasted coffee and recovered by absorption in the cold concentrated extract.

The foam inhibitor, for example, disodium phosphate dodecahydrate, can readily be incorporated in the coffee concentrate, for example, to the extent of about 4½ ounces of the disodium phosphate dodecahydrate per gallon of the concentrate. The addition of this amount of the disodium phosphate increases the pH value of the concentrate from around 5 or 5.1 to about 5.7. Somewhat larger amounts can be used but they do not materially increase the pH nor do they appear to have any appreciably increased effect in reducing objectionable foaming. The following example illustrates the composition of the coffee concentrate in a form suitable for use, with added sugar syrup, in making carbonated coffee beverages, the liquid coffee concentrate having a strength such as that above indicated, that is, corresponding to about 11 pounds of bean coffee:

| | |
|---|---|
| Liquid coffee concentrate | oz 104 |
| Caramel | fl. oz 12 |
| Sodium benzoate | oz 7½ |
| Sodium phosphate dodecahydrate | oz 4½ |
| Dye solution which contains approximately 10 grams of certified food dye | oz 8 |

The above formula corresponds to about one gallon of concentrate. It can be marketed in this form and used, by admixture with sugar syrup, in preparing carbonated coffee beverages.

An improved coffee syrup, adapted to be used, by adding to or admixing with carbonated water, can readily be prepared by admixing the liquid coffee concentrate, such as that of the above example, with sugar syrup, for example, by admixing one gallon of the above concentrate with 8 gallons of a 32° Baumé sugar syrup. Such a coffee syrup is suitable for use either by soda fountains in the production of a carbonated coffee beverage, or for use in forming bottled coffee beverages by admixture with carbonated water.

In preparing a bottled carbonated coffee beverage, about one ounce of the finished coffee syrup, made as above described, can be added to a 6½ ounce bottle together with carbonated water containing from 2 to 2½ volumes of carbon dioxide, and the bottled beverage then capped or sealed.

When a concentrated coffee extract which contains no foam inhibitor is used in making such a carbonated coffee beverage, the foam produced is stable and persistent and objectionable, both during the carbonating and bottling of the beverage, and when the bottle is opened. The addition of the foam inhibitor prevents the formation of an objectionably stable or persistent foam. Such foaming as occurs is unobjectionable since the foam readily breaks, leaving a substantially foam-free gas space in the bottle in which the carbonated beverage is formed or into which it is introduced.

From the above example it will be seen that the amount of foam inhibitor added to the coffee concentrate form only a small percentage of the concentrate, for example, around 3⅓% or somewhat more. When the concentrate is admixed with sugar syrup to form a coffee syrup, the amount of the inhibitor is correspondingly decreased, for example, to a fraction of a per cent of the syrup. When this syrup is used in forming the carbonated coffee beverage, the amount of the inhibitor present is still further reduced to a much smaller fraction of a per cent. This amount is nevertheless effective in imparting improved properties to the coffee concentrate, to the coffee syrup, and to the carbonated coffee beverage.

While the invention has been illustrated more particularly in connection with the use of disodium phosphate as the foam inhibitor, other very weak alkalies can be employed such as acid salts of the dibasic type or polybasic type, although we consider disodium phosphate particularity advantageous.

We claim:

1. A coffee concentrate having a small amount of disodium phosphate incorporated therein as a foam inhibitor, and said concentrate being adapted for use in making carbonated coffee beverages without objectionable foaming.

2. A liquid coffee concentrate having a small amount of disodium phosphate incorporated therein to give to the concentrate a pH value of about 5.7.

3. A coffee syrup comprising coffee concentrate and sugar syrup and having a small amount of disodium phosphate incorporated therein, said syrup being adapted for use in making carbonated coffee beverages without objectionable foaming.

4. A carbonated coffee beverage made from a coffee concentrate, sugar syrup and carbonated water, said beverage containing a small amount of disodium hydrogen phosphate as a foam inhibitor.

5. The improvement in the production of carbonated coffee beverages by admixing a coffee concentrate with a sugar syrup and forming the carbonated coffee beverage from the coffee syrup which comprises incorporating in the coffee concentrate a small amount of disodium phosphate.

DOUGLAS FRONMULLER.
FRANK M. BOYLES.